United States Patent [19]

Moumaneix et al.

[11] 4,277,031
[45] Jul. 7, 1981

[54] DUAL GAS SUPPLY BLOW TORCH

[75] Inventors: Francis Moumaneix, Le Raincy; Cesar Marietta, St Leu la Foret, both of France

[73] Assignee: Anciens Etablissements Leon Guilbert & Fils, Paris, France

[21] Appl. No.: 79,454

[22] Filed: Sep. 27, 1979

[30] Foreign Application Priority Data

Sep. 29, 1978 [FR] France ................................ 78 27934

[51] Int. Cl.³ ........................ F16K 11/18; F16K 7/20
[52] U.S. Cl. .................................... 239/414; 239/582; 137/607; 251/DIG. 1
[58] Field of Search ...................... 239/414, 417.5, 581, 239/582, 586; 138/43, 46; 137/137.2, 606, 607; 251/DIG. 1

[56] References Cited

U.S. PATENT DOCUMENTS

| 709,830 | 9/1902 | Snow | 239/414 X |
|---|---|---|---|
| 1,222,319 | 4/1917 | Mueller | 239/414 |
| 2,507,102 | 5/1950 | Hammon | 137/607 X |

FOREIGN PATENT DOCUMENTS

| 644713 | 10/1928 | France . |
|---|---|---|
| 35141 | 6/1929 | France . |
| 1018220 | 12/1952 | France . |
| 61874 | 5/1955 | France . |
| 2244948 | 4/1975 | France . |
| 2371623 | 6/1978 | France . |

Primary Examiner—Robert W. Saifer
Attorney, Agent, or Firm—Young & Thompson

[57] ABSTRACT

A dual gas supply blow torch has two gas inlets and a gas outlet for connection to a nozzle; a mixing and control valve operated by a single control device is interposed between the inlets and the outlet and this comprises a core axially displaceable in a bore provided with valve seatings. For each gas inlet the core has a valve formed by an annular elastic sealing joint engageable with a corresponding seating, and an escape passage is provided having a cross-section which can be varied by elastic deformation of the sealing joint in order to control the gas flow. At least one of the two valves has means for proportioning the gas flow rates.

7 Claims, 9 Drawing Figures

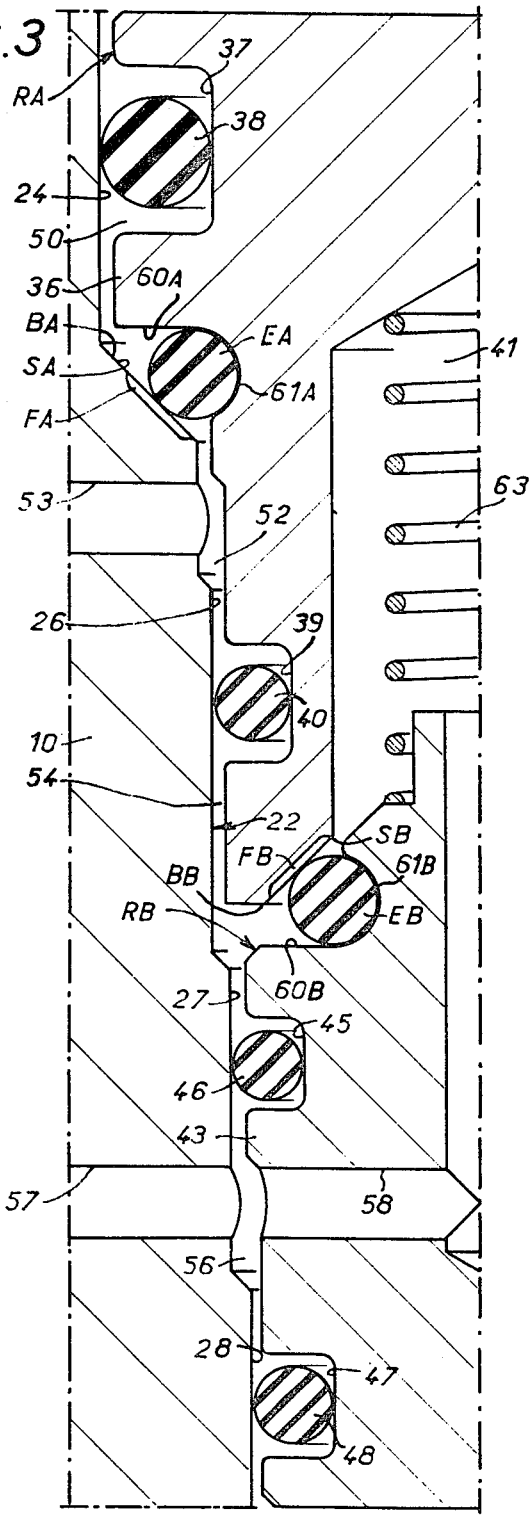
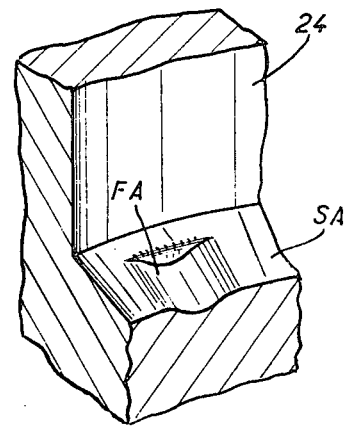
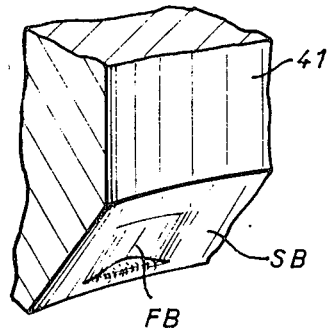

DUAL GAS SUPPLY BLOW TORCH

BACKGROUND OF THE INVENTION

This invention relates to a blow torch having a dual gas supply, notably a combustible gas supply and a combustive gas supply, comprising a body having a first inlet connection for a first gas, a second inlet connection for a second gas, an outlet connection for supplying a nozzle or lance with a mixture of the two gases, a first duct extending between the first connection and the outlet connection and comprising a first tap, and a second duct extending between the second connection and the outlet connection and comprising a second tap, wherein each of the two taps comprises a core with a shoulder which is axially displaceable in a bore with a seating, for closing and opening the respective inlet connection.

The combustible gas may be propane, butane, acetylene or hydrogen, whilst the combustive gas is, for example, either oxygen or induced or compressed air. A blow torch of this kind may operate, for example at 0.5 bars for the combustible gas and, when oxygen is used, at 2 bars for the oxygen.

In general, dual gas supply blow torches have two spindle-type taps each having two separate controls. Such an arrangement necessitates delicate handling, particularly for ignition, as the tap for the fuel has to be opened first and then the tap for the combustive gas has to be turned on until the correct flame is obtained. If the overall flow rate needs to be modified, this has to be done cautiously so as to obtain both the desired overall flow rate and the correct proportions in the mixture.

In general, spindle-type taps also have the disadvantage of being difficult to regulate at low flow rates, and for this reason they are often provided with a needle valve in order to obtain fine adjustment; these needles are however fragile and substantially add to the bulk of the taps and to their production costs.

Generally, blow torches cannot be operated over a wide range of flow rates and a set of several blow torches is required in order to obtain flow rates ranging from a fraction of a liter per hour to several thousand liters per hour.

This invention relates to a blow torch which does not have these disadvantages and which provides a convenient means of balancing the proportions of the flow rates of fuel gas and combustive gas, with total control of the flow rate of the mixture, whilst giving a very wide range of flow rates ranging from a fraction of a liter to several thousand liters per hour.

SUMMARY OF THE INVENTION

According to the invention, a blow torch for use with a dual gas supply is characterised in that, on the one hand, each tap comprises an annular elastic sealing joint which forms one of the above mentioned shoulders and seating, whilst the other consists of a bearing surface, and an escape passage is provided having a cross-section which is caused to vary by the effect of the elastic deformation of said joint when the closure is effected, and in that, on the other hand, a single control common to both taps is able to act simultaneously on said taps.

Taps with an elastic joint and an escape passage are described in particular in French Pat. No. 73 33897 filed on Sept. 21st 1973 for "Sealing device, particularly for taps" in the name of Anciens Ets Leon Guilbert & Fils and in the First Certificate of Addition thereto.

According to one feature of these taps, the curve which shows the variations in the cross-section of passage of the tap on the logarithmic scale, and hence in the flow rate on the logarithmic scale as a function of the course of opening on the linear scale, is in the form of an inclined straight line, whereas this curve is a highly curved one in the case of taps with spindles and needles.

This means that, when two taps with an elastic joint and an escape passage are provided in a dual gas supply blow torch, these two taps can readily be designed so that their representative linear curves are two parallel inclined straight lines, i.e. separated by a vertical distance which always remains the same, regardless of the degree of opening. This distance represents the difference between the logarithms of the flow rates, i.e. the logarithm of the ratio of the flow rates, which thus remains constant irrespective of the opening.

According to another property of these taps with an elastic joint and an escape passage, the elasticity of the joint makes it possible to continue the closure movement beyond the moment when the tap begins to be closed.

The combination of a single common control with two such taps in a blow torch means that, owing to the two features mentioned above, it has the double result of permitting, without any particular precautions:

(1) total control of the flow rate of the mixture of the two gases, without altering the ratio, appropriate to satisfactory functioning, of the flow rates of the two gases, irrespective of whether the flow rate of the mixture is great or small;

(2) total closure of the two taps, even if one of them starts to be closed before the other one, as the closure movement merely has to be continued in order to close the second tap whilst continuing to compress the elastic joint of the tap which was closed first.

The blow torch according to the invention is simple and compact in construction and easy to operate. It functions with a very wide range of flow rates ranging from less than one liter per hour to several thousand liters per hour, whereas until now it has generally been necessary to have a set of at least three blow torches to cover a range of flow rates of this size.

Preferably, the sealing joint of each tap is held diametrically by a circumferential flange along its outer or inner periphery. In this way, it operates solely under compression and there is no sliding frictional stress which could damage it.

According to another feature of the invention, one of the two taps is provided with individual regulating means by means of which, for a given operation, an appropriate proportion of flow rates of the two gases can be obtained once and for all, irrespective of the total flow rate controlled by the single common control.

The two taps and their associated bores are advantageously coaxial.

BRIEF DESCRIPTION OF THE DRAWINGS

FIG. 3 is a half-sectional view, on an even larger scale, of these two taps;

FIGS. 4 and 5 are perspective views of the escape passages of the two taps;

DESCRIPTION OF THE PREFERRED EMBODIMENTS

Reference will be made first to FIGS. 1 to 7 which show by way of example a blow torch C having a dual gas supply, one of which is the combustible or fuel gas such as propane, butane or acetylene, whilst the other is a combustive gas such as oxygen or induced air.

More specifically, the blow torch C operates at a pressure of 0.5 bar for the fuel gas and, when oxygen is used, at a pressure of 2 bars for the oxygen.

This blow torch can be used to carry out a great many different operations with a small number of interchangeable lances.

Figure 1:
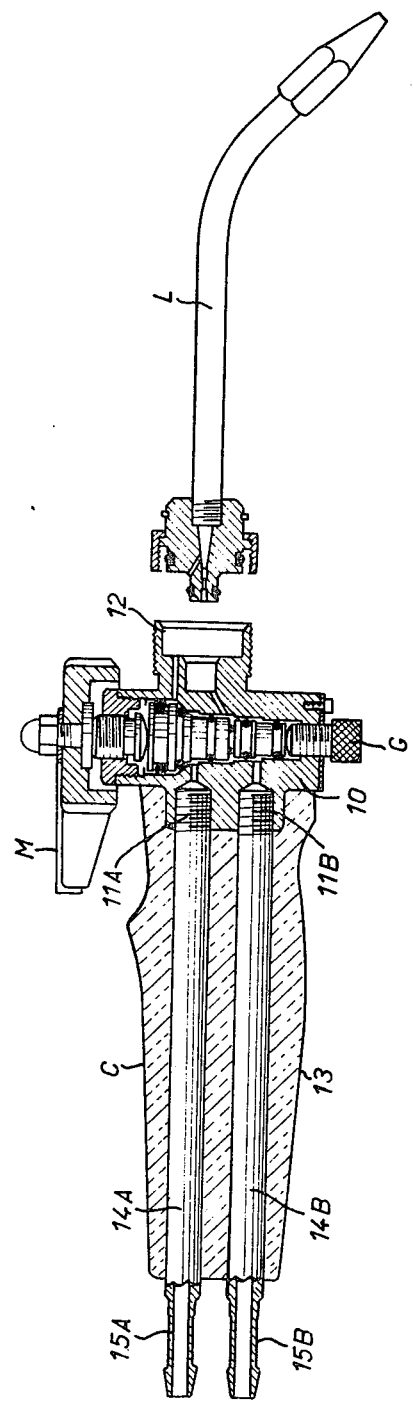
FIG. 1 is a general longitudinal section through a blow torch having a dual gas supply according to the invention.

FIG. 1 shows a lance L adapted to use with oxyacetylene but the blow torch C can easily be adapted, by adding an intermediate connection or simply changing the lance, to operate as an oxygen cutter or to operate with compressed air/gas or induced air/acetylene, or with oxypropane or oxybutane or with induced air/propane or induced air/butane. For use with induced air/gas, the oxygen injector on the lance is not drilled.

The blow torch C has a body 10 (FIGS. 1 and 2) having a first connection 11A for the inlet of the first gas, for example a fuel gas such as propane, butane, acetylene or hydrogen, a second connection 11B for the inlet of the second gas, e.g. a combustive gas such as oxygen or induced air or compressed air, and a third connection 12 for supplying the lance L with a mixture of the two gases.

The body 10 is located at the top of a handle 13 in which there extend two channels 14A and 14B communicating with the connections 11A and 11B, respectively, and having tips 15A and 15B for supplying them with fuel gas and combustive gas via flexible tubing.

The body 10 receives two coaxial valve means in the form of taps RA and RB acting, respectively, between the connections 11A and 12 and between the connections 11B and 12 and having a single common control M able to act simultaneously on these two taps RA and RB.

In the example in FIGS. 1 to 5, one of these two taps, i.e. the tap RB, is provided with individual regulating means G enabling the flow rates of the two taps RA and RB to be regulated relative to each other once and for all, for a predetermined operation, irrespective of the total flow rate controlled by the control M.

The body 10 of the blow torch C comprises (FIGS. 2 and 3) a central cross-hole 22 adapted to house the two taps RA and RB. The hole 22 comprises successively, from the control M located at one end to the regulating means G arranged at the other end: a threaded portion 23 of large diameter (FIG. 2), a cylindrical portion 24 of smaller diameter (FIGS. 2 and 3), a seat in the form of a conical seating SA (FIG. 3), cylindrical portions 26, 27 and 28 of decreasing diameter and a threaded portion 30 (FIG. 2) of still smaller diameter.

Engaging in the threaded portion 23 (FIG. 2) is a threaded stopper 31 which itself comprises a threaded hole 32 in which there engages a screw 33 integral with a handle 34 forming the control M.

The screw 33 terminates in a rounded end 35 (FIG. 2) abutting on the core 36 which acts to close the two taps RA and RB.

This first tap RA (FIGS. 2 and 3) has a movable sealing core 36 against which the end 35 of the screw 33 thrusts. This core 36 has an annular groove 37 in which is arranged a toric sealing joint 38 cooperating with the cylindrical portion 24 of the central hole 22.

The movable sealing core 36 of the first tap RA has a shoulder (FIG. 3) which consists of a seal in the form of an annular elastic sealing joint EA. The core 36 is able to be axially displaced so as to move the joint EA closer to and away from the conical seating SA, the joint EA and the seating SA comprising opposed transverse annular zones.

The core 36 comprises a second annular groove 39 in which is housed a joint 40 cooperating with the cylindrical portion 26 of the central hole 22. The core 36 comprises a blind hole 41 the opening of which forms a seat in the form of a conical seating SB for the other tap RB. The tap RB has a movable core 43 which has a shoulder formed by a seal in the form of an annular elastic sealing joint EB and cooperating with the conical seating SB the joint EB and the seating SB comprising opposed transverse annular zones.

The movable core 43 of the second tap RB has an annular groove 45 receiving a sealing joint 46 which cooperates with the cylindrical portion 27 of the central hole 22 and also another annular groove 47 which receives a sealing joint 48 cooperating with the cylindrical portion 28 of this central hole 22.

The annular space 50 which is defined in the hole 22 around the core 36 between the joints 38 and EA communicates permanently via a channel 51 of the body 10 (FIG. 2) with the connection 12.

The annular space 52 which is defined in the hole 22 around the core 36 between the joints EA and 40 communicates permanently via a channel 53 of the body 10 (FIG. 2) with the connection 11A.

The spaces 50 and 52 are made to communicate or are separated depending on whether the tap RA is open or closed.

The assembly 53, 52, 50, 51 thus constitutes a first duct which extends between the connections 11A and 13 and comprises the bore 50, SA, 52 having the first tap RA.

Figure 2:
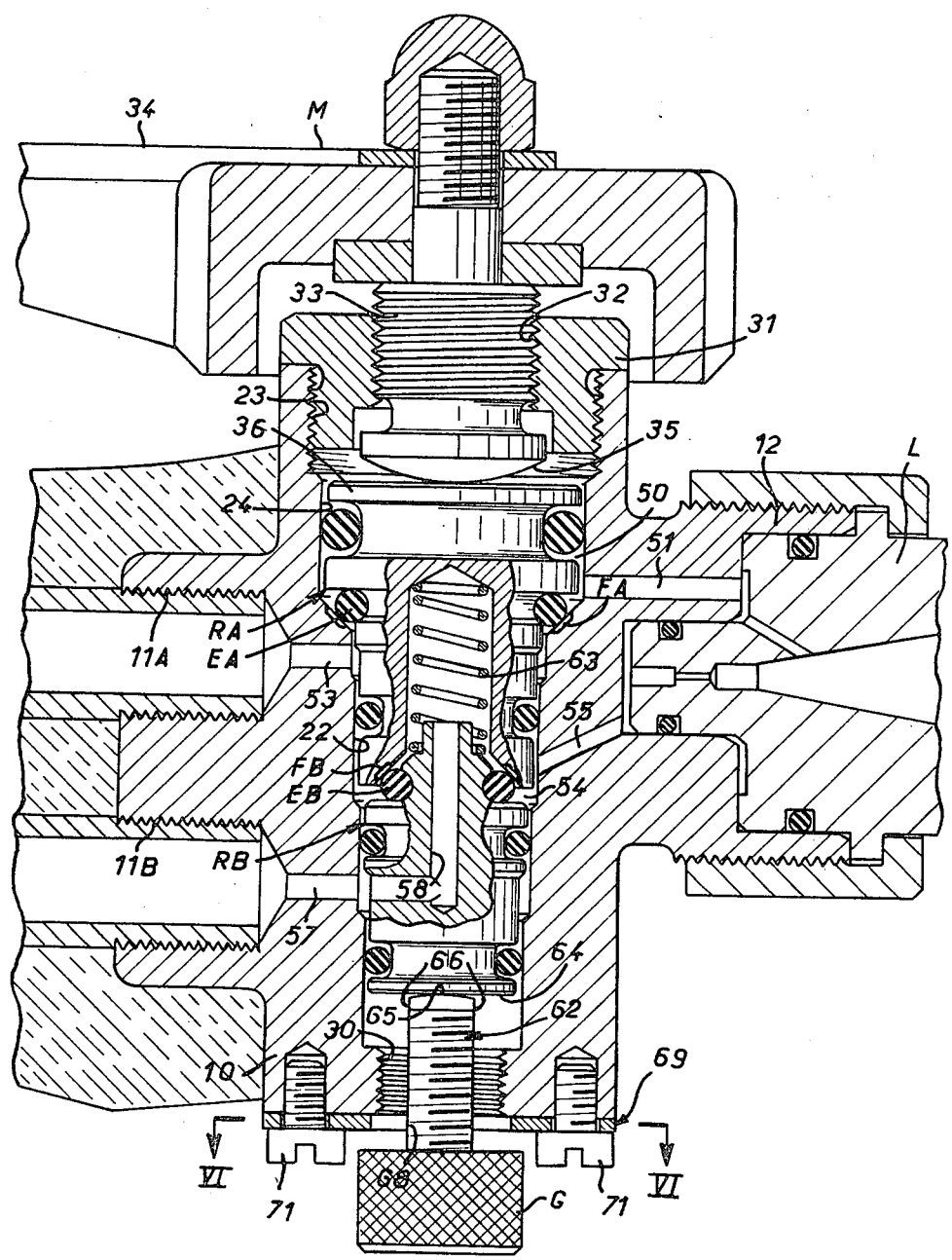
FIG. 2 is a view on a larger scale of the two taps of this blow torch and their common control.
Figure 6:
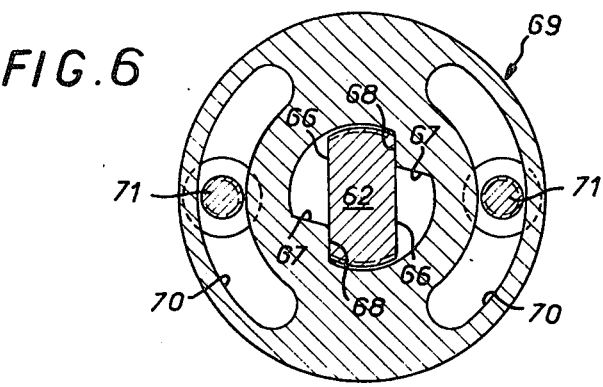
FIG. 6 is a view of a regulating washer, in a section on the line VI—VI in FIG. 2.

The annular space 54 which is defined in the hole 22 around the cores 36 and 43 between the joints 40 and 46 communicates permanently via a channel 55 of the body 10 with the connection 12 (FIG. 2).

The annular space 56 which is defined in the hole 22 around the core 43 between the joints 46 and 48 communicates permanently, on the one hand via a channel 57 of the body 10 with the connection 11B, and on the other hand via a channel 58 of the core 43 with the blind hole 41 of the core 36.

The spaces 54 and 56 are brought into communication or separated depending on whether the tap RB is open or closed.

The assembly 57, 56, 58, 41, 54, 55 thus constitutes a second duct which extends between the connections 11B and 12 and comprises the bore 41 containing the second tap RB.

Each of the two taps RA, RB has a feed passage FA, FB, respectively, the cross-section of which is caused to vary by the effect of the elastic deformation of the elastic joints EA, EB, respectively, at the moment of the seating of the closure.

More particularly, the passage FA, FB is formed by a plurality of depressions arranged in the surface of the conical seating SA, SB. Each depression FA, FB is shallow and is progressively connected to the continuous part of the seating SA, SB so as to avoid any damage to the joint EA, EB. Each depression FA, FB projects on each side of the joint EA, EB when the latter is flush with the seating SA, SB.

The passage FA, FB could consist of one or more narrowed portions of the joint EA, EB in which case the seating SA, SB would not comprise any depressions.

The joints EA, EB are held (FIG. 3) on the cores 36, 43, forming the mounting support, both axially by a radial shoulder providing a abutment 60A, 60B opposite the seating SA, SB and diametrically by a circumferential flange 61A, 61B the diameter of which corresponds to that of the sealing joint EA, EB in the non-deformed state. This diametric retaining flange 61A, 61B of the joint EA, EB extends over the inner periphery of this joint and is in the form of a clearance which is connected to the axial retaining abutment 60A, 60B and around which the sealing joint EA, EB is trapped.

Abutment means are provided at BA between the core 36 and the seating SA of the tap RA and at BB between the cores 43 and 36 of the taps RA and RB to limit the compression of the joint EA, EB.

Engaging in the threaded portion 30 of the hole 22 (FIG. 2) is a screw 62 constituting the adjustment means G for the tap RB.

Located in the blind hole 41 is a spring 63 tending on the one hand to hold the end 64 of the core 43 of the tap RB applied against a rounded end 65 of the regulating screw 62 and on the other hand to hold the core 36 applied against the convex part 35 of the screw 33, thus returning the taps RA and RB to the open position.

The regulating screw 62 comprises (FIGS 2 and 6) two flat portions 66 which are adapted to cooperate in abutment with two pairs of bearing surfaces 67 and 68 provided in a washer 69. This washer comprises two ports 70 in which screws 71 fixed to the body 10 engage.

The angular position of the washer 69 is thus regulatable. The bearing surfaces 67 and 68 define the angular course of the screw 62 in the bore 30 once the washer 69 has been angularly positioned.

Thus, within the limits of this course, the screw 62 can be used to regulate the richness of the mixture, i.e. the proportions of the flow rates of fuel gas and combustive gas. The limitation of the course of the screw 62 by means of the abutment bearing surfaces 67 and 68, which limitation can be regulated by the angular offsetting of the washer 69, has the effect of ensuring that when the control M arrives at the end of the closure course by first coming to abut at BA on the tap RA or at BB on the tap RB, the two taps are both completely closed, by adequate compression of their joints EA and EB.

For operation, a lance L is selected from a set of lances depending on the work to be done, with a fuel gas and a combustive gas suitably chosen for the purpose, e.g. acetylene at 0.5 bar and oxygen at 2 bars.

The blow torch having been regulated on a previous occasion, the handle 34 is opened, the gas is ignited, and optionally the proportion is corrected by means of the regulating screw G which fixes the ratio of the flow rates of fuel gas and combustive gas supplied to the lance L.

The proportion of flow rates thus adjusted for optimum functioning is adhered to regardless of the overall flow rate, large or small, which is controlled by the handle 34 of the control M common to both taps RA and RB.

This proportion is retained when the blow torch is extinguished or relit or set to pilot or full flow.

This property results from the fact that the taps RA and RB have elastic joints EA and EB and escape passages FA, FB.

Figure 7:
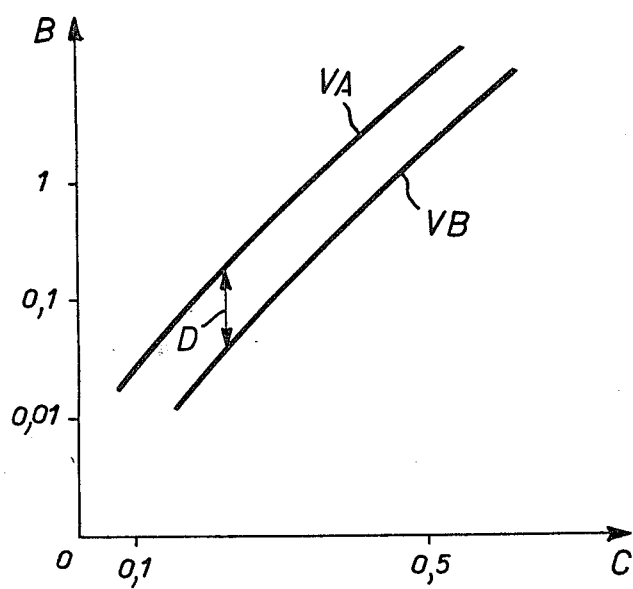
FIG. 7 is a diagram illustrating the variations in the cross-section of passage on the logarithmic scale of the two taps as a function of the course of opening on the linear scale.

Reference will now be made to the diagram in FIG. 7 which shows, by the curve VA, VB, the variations in the section of passage, on the logarithmic scale, and hence the variations in the flow rate, on the logarithmic scale, of the tap RA, RB as a function of the course of opening of the control M on the linear scale.

The abscissae C show the course of opening, in millimeters, on the linear scale and the ordinates B show the section of passage in square millimeters on the logarithmic scale. It will be seen that the curve VA or VB is linear and consists of an inclined straight line whereas a curve corresponding to a tap with a spindle or needle would be greatly curved with an almost vertical portion near the origin, followed by an arched portion, then an almost horizontal portion.

The two taps RA and RB are easily selected so that their representative linear curves VA and VB are two inclined straight lines parallel to each other, i.e. separated by a vertical spacing D which always remains constant, whatever the value of the course of opening C. The spacing D represents the difference between the logarithms of the flow rates, i.e. the logarithm of the ratio of flow rates of the two gases, which thus remains constant regardless of the position of the control M.

It will also be appreciated that when the control M arrives at the end of the course of closure by abutment at BA or BB, the two taps RA and RB are both securely closed.

During operation, the fuel gas admitted at 15A, 14A, 11A, 53 in the space 52 passes through the first tap RA, travelling between the sealing joint EA and the conical seating SA and from there passes into the space 50 and channel 51 to pass into the supply connection 12 for the lance L.

The combustive gas is admitted at 15B, 14B, 11B, 57 into the space 56 and from there via the channel 58 of the tap RB into the hole 41 of the tap RA to pass between the joint EB and the seating SB, and thence into the space 54 and into the channel 55 to reach the connection 12 of the lance, where it is allowed to mix with the fuel gas.

The blow torch permits a large overall flow rate with a large opening when the handle 34 permits considerable raising of the screw 33 and consequently, thanks to the return action of the spring 63, a spacing between the joint EA and its seating SA and between the joint EB and its seating SB. The blow torch thus has a very large flow rate of, for example, several thousand liters per hour, whatever the value of the pressure and in particular when the pressure is 0.5 bar for the fuel gas and 2 bars for the combustive gas.

When the handle 34 is operated to reduce the flow rate, the proportions of the flow rates of fuel gas and combustive gas are maintained. The joint EA moves toward the seating SA and the joint EB moves toward the seating SB.

It should be noted that this flow rate can be reduced until one of the joints EA, EB, and preferably both joints, is flush with the seating SA, SB. The flow rate is thus extremely small as it can only pass through a small fraction of the depressions FA, FB by passing round the joint EA, EB. The flow rate can thus be reduced to less than one liter per hour. It will be appreciated that the adjustment is carried out by a simple maneuver using the handle 34 alone.

To obtain total closure, the handle 34 continues to be displaced in the same direction, thus compressing the joints EA, EB into the depressions FA, FB.

It will be appreciated that, depending on the form and number of the depressions FA, FB and also the geometry of the taps RA, RB, the maximum flow rate can be attained for a greater or smaller spacing between the joint EA, EB and the seating SA, SB and may even be achieved when the joint EA, EB is flush with the seating SA, SB, this maximum flow rate then passing solely through the depressions FA, FB under the joint EA, EB.

It should be noted that the sealing joint EA, EB which is firmly held diametrically by the clearance 61A, 61B does not undergo any frictional sliding but is applied progressively and is compressed under conditions which are excellent for its performance.

The compression of the sealing joints EA, EB is limited by the first arrival in the abutment position at BA or BB.

The blow torch has an excellent service life and a substantial number of opening and closing operations can be performed before the joints need to be replaced.

It will be appreciated that the blow torch according to the invention is particularly robust and is very easy to operate, thus enabling almost universal use with two gases with a small number of lances and excellent operating conditions, as the flow rate is controlled by means of the handle 34 alone, respecting the proportion of the flow rates of fuel gas and combustive gas pre-set by means of the screw 62.

It will also be noted that this regulating screw 62 enables the apparatus to be supplied at pressure extending over a wide range.

Figure 8:
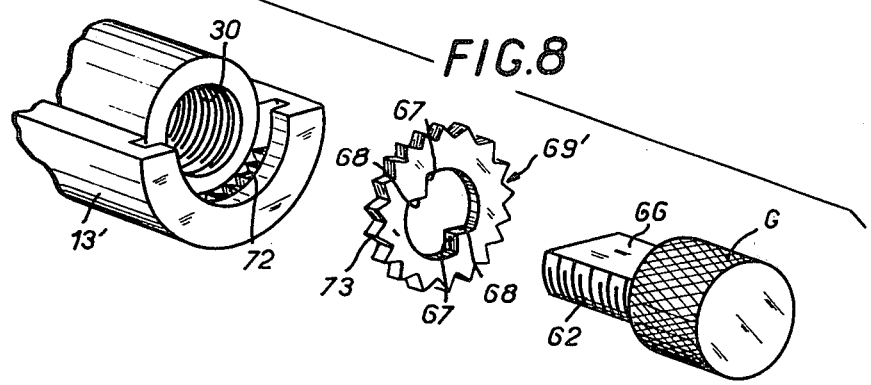
FIG. 8 is an exploded perspective view of a variant of the adjustment washer and its mounting.

Reference will now be made to FIG. 8 which relates to an alternative embodiment of the regulating washer 69, here designated 69', and its mounting.

The handle 13 is in two half-shells one of which is shown at 13' in FIG. 8. It has a notching at 72 with which notches 73 on the washer 69' cooperate, thus permitting angular adjustment thereof. Reference 66 shows the flat portions of the screw 62 and 67 and 68 show the abutment bearing surfaces of the washer.

In another variant (FIG. 9), the arrangement is similar to that described with reference to FIGS. 1 to 7 or with reference to FIG. 8 and 11A indicates the inlet connection for fuel gas, 11B is the inlet connection for combustive gas and 12 is the connection for supplying the lance with the mixture of the two gases, M is the single control for the two taps RA, RB and G is the regulating screw for regulating the proportion of flow rates of the two gases, but here the single control M acts on the taps RA and RB via ball bearings 75 interposed between the screw 33 and conical ends 76 and 77 of the cores of the two taps RA and RB.

Two return springs 78 and 79 are respectively associated with the two taps and act on the cores thereof.

As before, passages FA and FB are provided in the seatings SA, SB of the two taps and cooperate with the annular sealing joints EA, EB.

Figure 9:
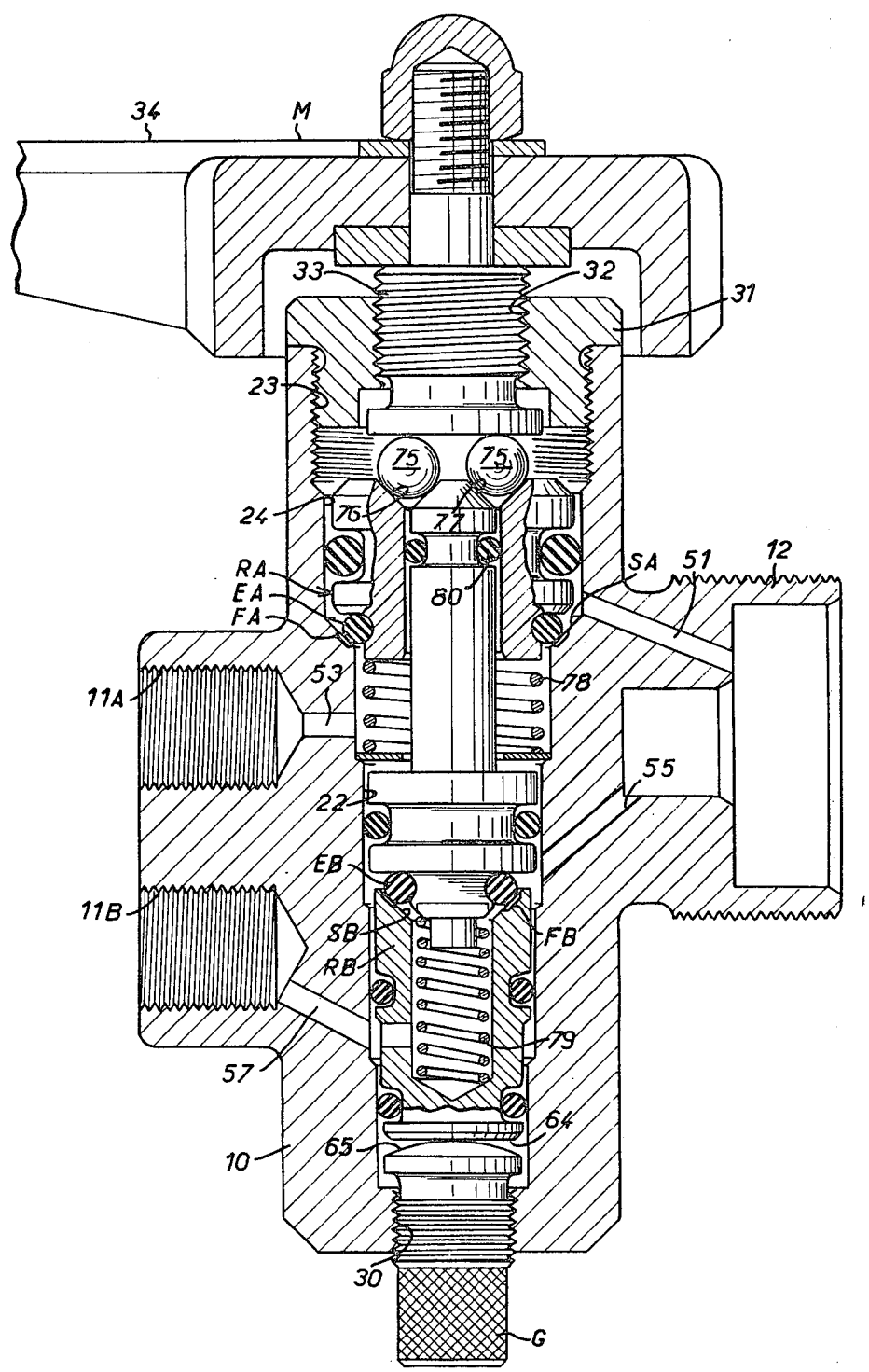
FIG. 9 is a view similar to FIG. 2 but relating to a variant of the blow torch.

The same reference numerals have been used in FIG. 9 and in FIGS. 1 to 7 to denote similar parts.

The method of operation is similar to that described with reference to FIGS. 1 to 7.

The difference is in the closure safety device which, previously, limited the rotational course of the regulating screw G and which, here in FIG. 9, is replaced by the device with ball bearings and two cones at 76 and 77, each of the cores being provided with one of the two cones.

This device enables the first tap which arraves in the mechanical abutment position to act as a support point for transmitting the closure movement of the second tap via the ball bearings and the contacts on the cones 76 and 77.

Thus, for all the positions of the screw G, it is guaranteed that the two taps can be closed by the single control M.

To some extent, the core 36 in FIG. 2 has been broken up into a set of two cores movable in each other and ball bearings, these two cores being braked relative to each other by an additional sealing joint 80 mounted on the stem of the lower core.

I claim:

1. A blow torch having a dual gas supply one of which is a fuel gas and the other of which is a combustion supporting gas, comprising a body having a first inlet connection for a first gas, a second inlet connection for a second gas, an outlet connection for supplying a lance with a mixture of the two gases, a first duct extending between the first inlet connection and the outlet connection and comprising a first valve means, and a second duct extending between the second inlet connection and the outlet connection and comprising a second valve means, a single control for the total flow rate of the mixture of the two gases common to the first and second valve means and adapted to act simultaneously on the first and second valve means, each of said valve means comprising a bore member and a core member, each of said bore members and its associated core member having opposed transverse annular zones, said core member being displaceable in its associated bore member between open and closed positions, said annular zone of a first of said members having an annular elastic seal, while said annular zone of a second of said members forms a seat for said seal, supporting means including a radial shoulder for holding said seal on said first member axially opposite to said seat and a circumferential flange for holding said seal radially, the diameter of said flange being substantially that of said seal in its undeformed state, and a feed passage in each of said valve means with a cross section which can be varied by elastic deformation of said seal of its associate valve means, at least one of said valve means having regulating means for metering the relative flow rates of the first and second gases.

2. A blow torch having a dual gas supply one of which is a fuel gas and the other of which is a combustion supporting gas, comprising a body having a first inlet connection for a first gas, a second inlet connection for a second gas, an outlet connection for supplying a lance with a mixture of the two gases, a first duct extending between the first inlet connection and the outlet connection and comprising a first valve means, and a second duct extending between the second inlet connection and the outlet connection and comprising a second valve means, a single control for the total flow rate of the mixture of the two gases common to the first and second valve means and adapted to act simultaneously on the first and second valve means, each of said valve means comprising a bore member and a core member, each of said bore members and its associated core member having opposed transverse annular zones, said core member being displaceable in its associated bore member between open and closed positions, said annular zone of a first of said members having an annular elastic seal, while said annular zone of a second of said members forms a seat for said seal, a feed passage in each of said valve means with a cross section which can be varied by elastic deformation of said seal of its associate valve means, at least one of said valve means having regulating means for metering the relative flow rates of the first and second gases, and abutment means between said bore and said core members of each of said valve means to limit the compression of the seal.

3. A blow torch having a dual gas supply one of which is a fuel gas and the other of which is a combustion supporting gas, comprising a body having a first inlet connection for a first gas, a second inlet connection for a second gas, an outlet connection for supplying a lance with a mixture of the two gases, a first duct extending between the first inlet connection and the outlet connection and comprising a first valve means, and a second duct extending between the second inlet connection and the outlet connection and comprising a second valve means, a single control for the total flow rate of the mixture of the two gases common to the first and second valve means and adapted to act simultaneously on the first and second valve means, each of said valve means comprising a bore member and a core member, each of said bore members and its associated core member having opposed transverse annular zones, said core member being displaceable in its associated bore member between open and closed positions, said annular zone of a first of said members having an annular elastic seal, while said annular zone of a second of said members forms a seat for said seal, and a feed passage in each of said valve means with a cross section which can be varied by elastic deformation of said seal of its associate valve means, at least one of said valve means having regulating means for metering the relative flow rates of the first and second gases, said valve means being coaxial and said single common control acting on an axially displaceable unit forming both said first member of one of said valve means and said second member of the other of said valve means.

4. A blow torch having a dual gas supply one of which is a fuel gas and the other of which is a combustion supporting gas, comprising a body having a first inlet connection for a first gas, a second inlet connection for a second gas, an outlet connection for supplying a lance with a mixture of the two gases, a first duct extending between the first inlet connection and the outlet connection and comprising a first valve means, and a second duct extending between the second inlet connection and the outlet connection and comprising a second valve means, a single control for the total flow rate of the mixture of the two gases common to the first and second valve means and adapted to act simultaneously on the first and second valve means, each of said valve means comprising a bore member and a core member, each of said bore members and its associated core member having opposed transverse annular zones, said core member being displaceable in its associated bore member between open and closed positions, said annular zone of a first of said members having an annular elastic seal, while said annular zone of a second of said members forms a seat for said seal, a feed passage in each of said valve means with a cross section which can be varied by elastic deformation of said seal of its associate valve means, at least one of said valve means having regulating means for metering the relative flow rates of the first and second gases, a blind hole in said unit, and a channel in said first member of said other valve means and communicating with said blind hole.

5. A blow torch having a dual gas supply one of which is a fuel gas and the other of which is a combustion supporting gas, comprising a body having a first inlet connection for a first gas, a second inlet connection for a second gas, an outlet connection for supplying a lance with a mixture of the two gases, a first duct extending between the first inlet connection and the outlet connection and comprising a first valve means, and a second duct extending between the second inlet connection and the outlet connection and comprising a second valve means, a single control for the total flow rate of the mixture of the two gases common to the first and second valve means and adapted to act simultaneously on the first and second valve means, each of said valve means comprising a bore member and a core member, each of said bore members and its associated core member having opposed transverse annular zones, said core member being displaceable in its associated bore member between open and closed positions, said annular zone of a first of said members having an annular elastic seal, while said annular zone of a second of said members forms a seat for said seal, a feed passage in each of said valve means with a cross section which can be varied by elastic deformation of said seal of its associate valve means, at least one of said valve means having regulating means for metering the relative flow rates of the first and second gases, and a spring returning said first and second valve means to the open position, said spring acting between said unit and said first member of said other valve means.

6. A blow torch having a dual gas supply one of which is a fuel gas and the other of which is a combustion supporting gas, comprising a body having a first inlet connection for a first gas, a second inlet connection for a second gas, an outlet connection for supplying a lance with a mixture of the two gases, a first duct extending between the first inlet connection and the outlet connection and comprising a first valve means, and a second duct extending between the second inlet connection and the outlet connection and comprising a second valve means, a single control for the total flow rate of the mixture of the two gases common to the first and second valve means and adapted to act simultaneously on the first and second valve means, each of said valve means comprising a bore member and a core member, each of said bore members and its associated core member having opposed transverse annular zones, said core member being displaceable in its associated bore member between open and closed positions, said annular zone of a first of said members having an annular elastic seal, while said annular zone of a second of said members forms a seat for said seal, and a feed passage in each of said valve means with a cross section which can be varied by elastic deformation of said seal of its associate valve means, at least one of said valve means having regulating means for metering the relative flow rates of the first and second gases, said common control acting in parallel on said first and second valve means and on said core members of said first and second valve means, said regulating means being associated with said bore member of one of said valve means.

7. A blow torch having a dual gas supply one of which is a fuel gas and the other of which is a combustion supporting gas, comprising a body having a first inlet connection for a first gas, a second inlet connection for a second gas, an outlet connection for supplying a lance with a mixture of the two gases, a first duct extending between the first inlet connection and the outlet connection and comprising a first valve means, and a second duct extending between the second inlet connection and the outlet connection and comprising a second valve means, a single control for the total flow rate of the mixture of the two gases common to the first and second valve means and adapted to act simultaneously on the first and second valve means, each of said valve means comprising a bore member and a core member, each of said bore members and its associated core member having opposed transverse annular zones, said core member being displaceable in its associated bore member between open and closed positions, said annular zone of a first of said members having an annular elastic seal, while said annular zone of a second of said members forms a seat for said seal, a feed passage in each of said valve means with a cross section which can be varied by elastic deformation of said seal of its associate valve means, at least one of said valve means having a regulating means for metering the relative flow rates of the first and second gases, and a spring associated with each said valve means and acting on the core member thereof to return each of said valve means to the open position.

* * * * *